United States Patent
Hawes et al.

(10) Patent No.: US 10,462,380 B2
(45) Date of Patent: Oct. 29, 2019

(54) CAMERA SYSTEM WITH LIGHT-SHIELD

(71) Applicant: APTIV TECHNOLOGIES LIMITED, St. Michael (BB)

(72) Inventors: Kevin J. Hawes, Greentown, IN (US); Ronald M. Taylor, Greentown, IN (US)

(73) Assignee: APTIV TECHNOLOGIES LIMITED (BB)

( * ) Notice: Subject to any disclaimer, the term of this patent is extended or adjusted under 35 U.S.C. 154(b) by 123 days.

(21) Appl. No.: 15/180,271

(22) Filed: Jun. 13, 2016

(65) Prior Publication Data

US 2017/0359495 A1  Dec. 14, 2017

(51) Int. Cl.
| | |
|---|---|
| *H04N 5/238* | (2006.01) |
| *H04N 5/225* | (2006.01) |
| *G03B 11/02* | (2006.01) |
| *G02B 5/00* | (2006.01) |
| *G05D 1/02* | (2006.01) |
| *G03B 11/04* | (2006.01) |

(52) U.S. Cl.
CPC ............ *H04N 5/238* (2013.01); *G02B 5/003* (2013.01); *G03B 11/02* (2013.01); *G05D 1/0246* (2013.01); *H04N 5/2254* (2013.01); *G03B 11/045* (2013.01)

(58) Field of Classification Search
CPC ........ G03B 11/045; G03B 9/02; G03B 11/00; G03B 11/04; B60R 11/04; H04N 5/2254; H04N 5/2354; H04N 5/235; H04N 5/2351
See application file for complete search history.

(56) References Cited

U.S. PATENT DOCUMENTS

| | | | | |
|---|---|---|---|---|
| 3,397,023 A | * | 8/1968 | Land ......................... | G02B 5/23 250/226 |
| 5,387,958 A | * | 2/1995 | Pashley ................... | H04N 5/238 348/224.1 |
| 5,479,298 A | * | 12/1995 | Yanagi ...................... | G02B 5/22 359/233 |
| 5,523,811 A | * | 6/1996 | Wada ........................ | B60R 1/00 348/118 |
| 5,541,705 A | | 7/1996 | Kan et al. | |
| 6,028,303 A | * | 2/2000 | Suzuki ................. | G02B 27/281 250/225 |
| 6,771,315 B1 | * | 8/2004 | Nanjo ................... | H04N 5/2254 348/335 |
| 7,245,325 B2 | * | 7/2007 | Yamaguchi .......... | H04N 5/2254 348/363 |
| 9,409,464 B2 | * | 8/2016 | Tomkins ................. | G02F 1/163 |
| 2002/0071185 A1 | | 6/2002 | Chretien et al. | |
| 2002/0131170 A1 | * | 9/2002 | Costales ................ | G02B 21/22 359/464 |

(Continued)

FOREIGN PATENT DOCUMENTS

| | | | |
|---|---|---|---|
| DE | 199 16 000 A1 | 10/2000 | |
| JP | 10-327337 | * 8/1998 | ............. H04N 5/225 |

*Primary Examiner* — Twyler L Haskins
*Assistant Examiner* — Akshay Trehan
(74) *Attorney, Agent, or Firm* — Joseph Victor Bonadies (57) ABSTRACT

A camera system suitable for use on an automated vehicle, includes an imager used to detect an image of a field-of-view of the system, a light-shield operable to block a portion of the image from being received by the imager, and a controller in communication with the imager and the light-shield. The controller is configured to position the light-shield in a line-of-sight between a bright-spot and the imager.

19 Claims, 8 Drawing Sheets

(56) References Cited

U.S. PATENT DOCUMENTS

| | | | |
|---|---|---|---|
| 2003/0169213 A1* | 9/2003 | Spero | G02B 5/20 |
| | | | 345/7 |
| 2004/0223075 A1* | 11/2004 | Furlan | H04N 5/2254 |
| | | | 348/363 |
| 2005/0117027 A1* | 6/2005 | Fukuhara | B60R 11/04 |
| | | | 348/222.1 |
| 2008/0037092 A1* | 2/2008 | Umezu | G02B 5/205 |
| | | | 359/227 |
| 2010/0094501 A1* | 4/2010 | Kwok | G02B 27/01 |
| | | | 701/36 |
| 2011/0141336 A1* | 6/2011 | Mittleman | G02B 5/005 |
| | | | 348/340 |
| 2012/0075510 A1* | 3/2012 | Sato | G02B 5/281 |
| | | | 348/273 |
| 2012/0261551 A1* | 10/2012 | Rogers | G02B 3/14 |
| | | | 250/208.1 |
| 2014/0009615 A1* | 1/2014 | Kiyohara | H04N 7/18 |
| | | | 348/148 |
| 2014/0063049 A1* | 3/2014 | Armstrong-Muntner | |
| | | | G03B 9/00 |
| | | | 345/619 |
| 2015/0092083 A1 | 4/2015 | Lam | |
| 2015/0163389 A1 | 6/2015 | Liang et al. | |
| 2015/0220793 A1* | 8/2015 | Kiyohara | G06K 9/00805 |
| | | | 382/103 |
| 2016/0182792 A1* | 6/2016 | Aoki | G03B 9/02 |
| | | | 348/364 |
| 2017/0123293 A1* | 5/2017 | Yuen | B60R 11/04 |

\* cited by examiner

CAMERA SYSTEM WITH LIGHT-SHIELD

TECHNICAL FIELD OF INVENTION

This disclosure generally relates to a vision system, and more particularly relates to a vision system suitable for use on an automated vehicle.

BACKGROUND OF INVENTION

It is known that camera systems are severely impaired when a bright light source, such as the Sun or head-lights from an on-coming vehicle for example, is in the direct field-of-view. The light-to-dark contrast of sunlight compared to the surrounding objects may be on the order of one-hundred-ten decibels (110 dB) which typically exceeds the linear dynamic range of camera systems. The brightness of the sunlight causes the camera to reduce the exposure times to prevent saturation and consequently lowers the contrast across all image-elements resulting in a darkened image. This causes loss of critical image-data that is required for the vision functions of autonomous-vehicles, such as lane recognition, pedestrian detection, stop-light recognition, vehicle recognition and other autonomous driving object-recognition capabilities. Other vision-systems may be similarly affected such as, robot vision-systems, welding control-systems, military tracking-systems, autonomous vision-systems including space, aircraft and ground based vehicles.

SUMMARY OF THE INVENTION

Described herein is a camera system capable of significantly reducing the dynamic range of brightness of a scene in the field-of-view of the camera.

In accordance with one embodiment, a camera system suitable for use on an automated vehicle is provided. The camera system includes an imager used to detect an image of a field-of-view of the system. The camera system also includes a light-shield operable to block a portion of the image from being received by the imager. The camera system also includes a controller in communication with the imager and the light-shield, and the controller is configured to position the light-shield in a line-of-sight between a bright-spot and the imager.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
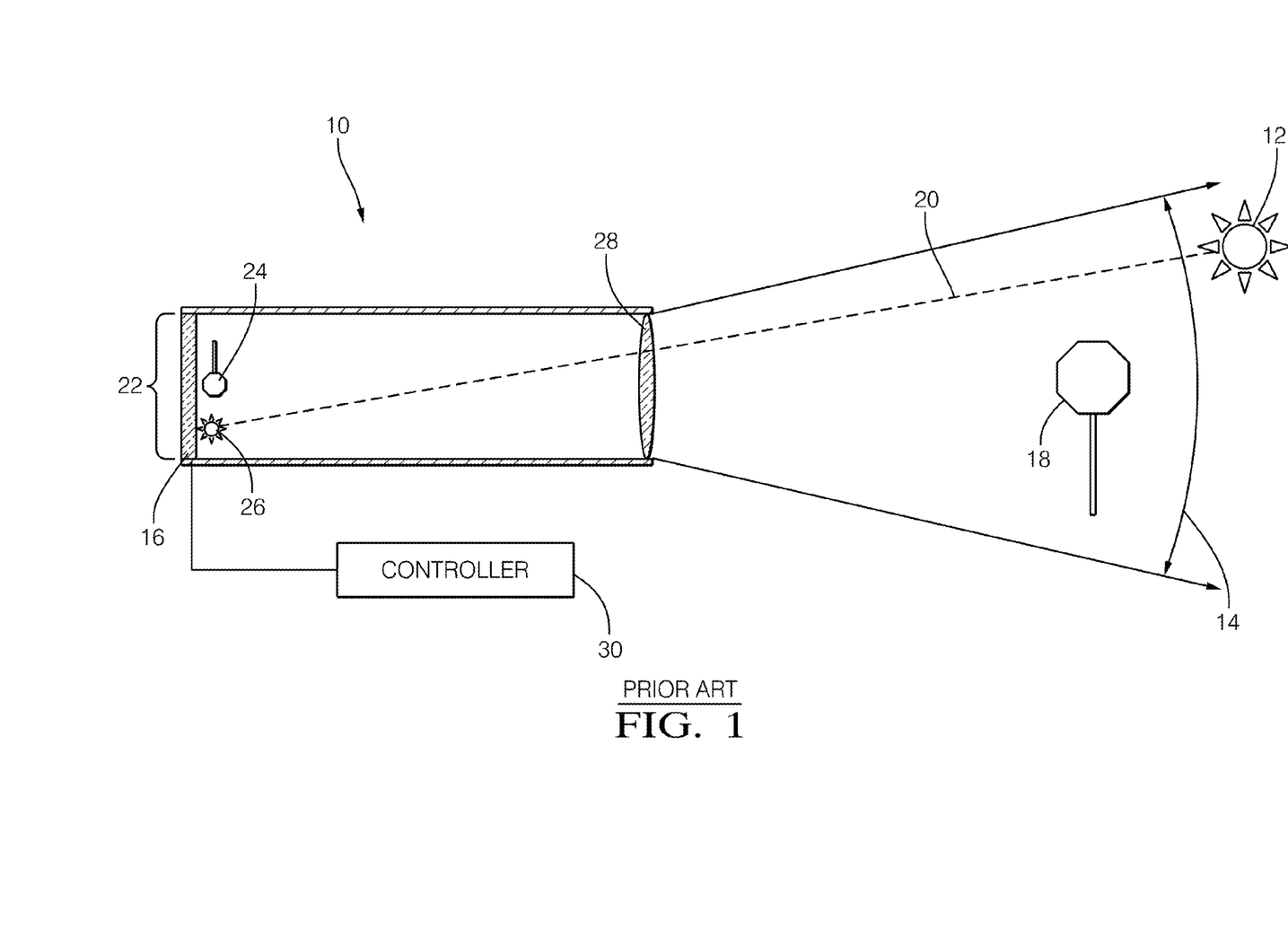
FIG. 1 is a prior art camera system in accordance with one embodiment.

FIG. 1 illustrates a non-limiting example of a camera system 10, hereafter referred to as the camera 10, which may be adversely affected by a bright-spot 12 in a field-of-view 14 of the camera 10. The intensity of the light from the bright-spot 12, illustrated by the Sun for purposes of example only, may saturate an imager 16 of the camera 10. Both an object 18 and the bright-spot 12 are in the field-of-view 14. A line-of-sight 20 is defined between the bright-spot 12 and a location on the imager 16 of the camera 10 where the bright-spot 12 is detected by the imager 16. The image 22 includes an object-image 24 and a bright-spot-image 26 and other features not shown that are in the field-of-view 14 of the camera 10, as will be recognized by one skilled in the art of optics. The adverse result of the saturated imager 16 is an object-image 24 that appears to be much darker than the object 18. The object 18 may be a street sign, a lane marking, or a pedestrian for example, that may become undetectable by the camera 10 due to the saturation of the imager 16. The image 22 is shown inverted on the imager 16 as the rays of light pass through a single camera-lens 28 by way of a non-limiting example only. Multiple camera-lenses 28 of varying geometries may be used in the camera 10, as will be recognized by one skilled in the art of optics. The imager 16 may be in electrical communication with a controller 30 to process the image 22 based on the application of the camera 10 as will be recognized by one skilled in the art of vision-systems.

Figure 2:
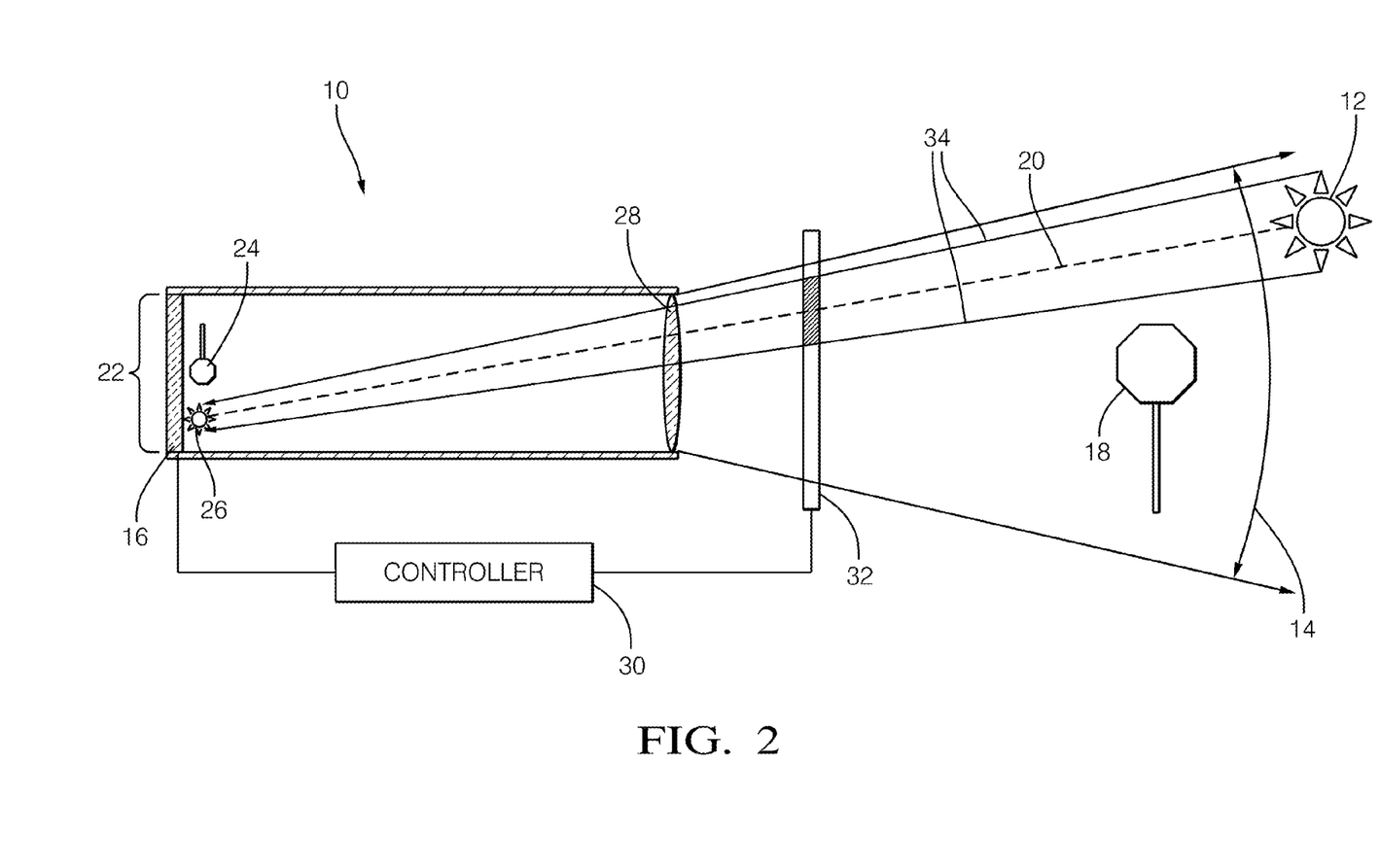
FIG. 2 is a camera system that is modified with a light-shield in accordance with one embodiment.
Figure 3:
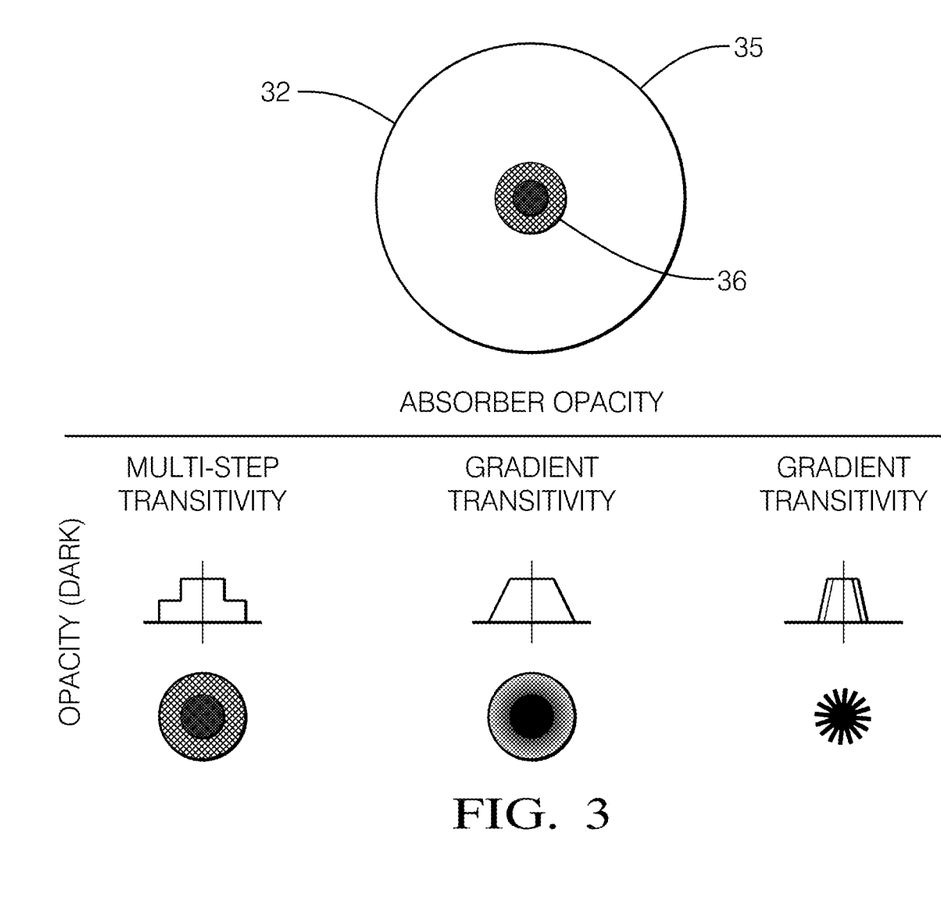
FIG. 3 is a light-shield in accordance with one embodiment.

FIG. 2 illustrates an example of the camera 10 from FIG. 1 that is modified with a light-shield 32 to reduce the intensity of light-rays 34 from the bright-spot 12 in the field-of-view 14 of the camera 10. The addition of the light-shield 32 is expected to reduce the light-to-dark contrast of sunlight compared to the surrounding objects 18, from levels as high as 110 dB by as much as 46 dB. Removing the brightness of the sunlight improves the image-contrast of the remaining scene. This improvement in contrast has the benefit of improved object-detection and improved object-recognition and further allows the use of less expensive vision-systems whose dynamic range is typically limited to less than 70 dB. The light-shield 32 may be located between the camera-lens 28 and the bright-spot 12, and may be in electrical communication with the controller 30 such that the light-shield 32 may be moved to a position in the line-of-sight 20 with the bright-spot 12 and the imager 16. The light-shield 32 may be comprised of a transparent-film 35 that supports an absorber 36 (FIG. 3) sized to block a portion or all of the light-rays 34 of the bright-spot 12 from reaching the imager 16. In the non-limiting example illustrated in FIG. 2, the absorber 36 may be sized to match the resultant circular diameter of the Sun on the visual horizon, based on the distance of the light-shield 32 to the camera-lens 28 and the distance to the imager 16. The absorber 36 may be filtered to block a visible-wavelength-camera that is sensitive to wavelengths in the range of four-hundred nanometers (400 nm) to 700 nm, or it may be filtered so that it blocks the near-infrared wavelengths from 700 nm to 1000 nm for use in a night-vision-camera, or it may be filtered so that it blocks both the visible and the near-infrared wavelengths from 400 nm to 1000 nm. Other geometries of the absorber 36 are contemplated and will be recognized by one skilled in the art. The opacity of the absorber 36 may be varied across its diameter and may aid the controller 30 in tracking the bright-spot 12. The opacity may be varied as multiple concentric circles, where the center of the absorber 36 may the darkest, with each subsequent concentric circle being less opaque. Alternatively, the opacity may be a continuous gradient. When the bright-spot 12 is not detected by the imager 16 the controller 30 may position the absorber 36 at the limits of the field-of-view 14 to minimize the amount of image-data that is obscured. The light-shield 32 may include multiple transparent-films 35 supporting the absorber 36 that may be moved independently from one another to be positioned in the line-of-sight 20 of multiple bright-spots 12. Alternatively a liquid crystal display (LCD), or similar dynamic shape adjustment devices, may be used in place of the transparent-film 35 and absorber 36 to reduce the intensity of the light-rays 34 from the bright-spot 12. Non-limiting examples of multiple bright-spots 12 may be headlamps from approaching vehicles, and the Sun and reflected sunlight (e.g. glint). The position of the bright-spot 12 as detected by the imager 16 may be tracked by the controller 30 across the field-of-view 14. The controller 30 may be configured to position the light-shield 32 using ultrasonic linear motors, servo-motors, and other known devices until the intensity of the light-rays 34 from the bright-spot 12 as detected by the imager 16 are minimized. The result is a reduced maximum light level transmitted onto the imager 16 which allows for improved object-detection and improved object-recognition.

Figure 4:
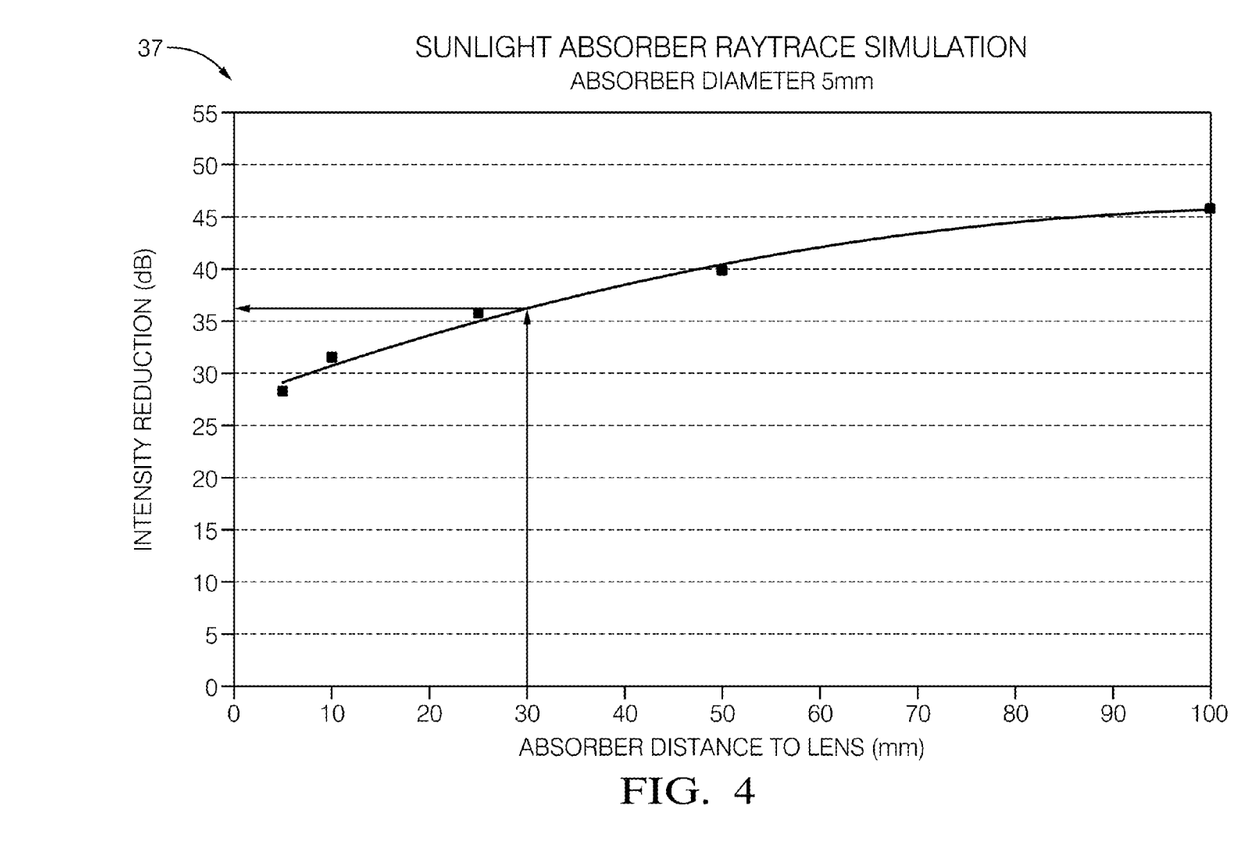
FIG. 4 is a graph of the light intensity reduction in accordance with one embodiment.

The location of the light-shield 32 relative to the imager 16, and the size of the absorber 36, affects the reduction in light intensity of the incoming light-rays 34. FIG. 4 is a graph 37 of a simulation of the effect of the light intensity reduction based on the diameter of the absorber 36 and its distance from the camera-lens 28 (FIG. 2). At a distance of thirty millimeters (30 mm) from the camera-lens 28 the absorber 36 with a 5 mm diameter creates a thirty-six decibel (36 dB) intensity reduction of sunlight. The 30 mm distance to the camera-lens 28 is thought to be a viable placement for the absorber 36 where a windshield-mounted vision-system is used, due to the proximity of the camera-lens 28 to the windshield of the vehicle. While this simulation was performed with a particular design of the camera-lens 28, it would be apparent to one skilled in the art of optics that the output of the simulation will vary based on the design features of the camera-lens 28.

Figure 5:
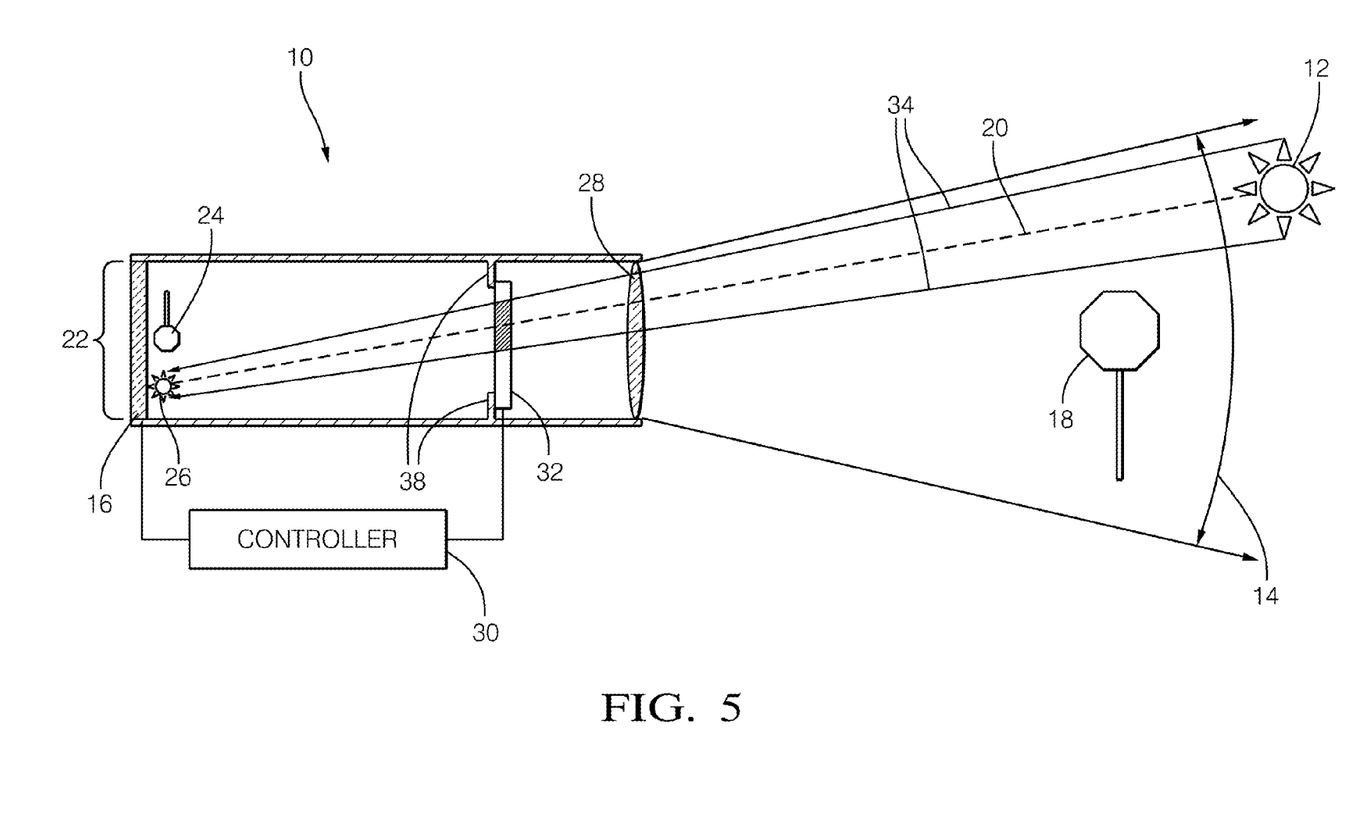
FIG. 5 is a camera system that is modified with a light-shield and an aperture-stop in accordance with one embodiment.

FIG. 5 illustrates another example of the camera 10 from FIG. 1 that is modified with a light-shield 32 and an aperture-stop 38 to reduce the intensity of the light-rays 34 from the bright-spot 12 in the field-of-view 14 of the camera 10. The light-shield 32 may be located between the camera-lens 28 and the aperture-stop 38, and may be in electrical communication with the controller 30 such that the light-shield 32 may be moved to a position in the line-of-sight 20 with the bright-spot 12 and the imager 16. While FIG. 5 shows the aperture-stop 38 between the camera-lens 28 and the imager 16, it is contemplated that the advantages of the camera 10 described herein will also be realized for configurations of cameras 10 where the aperture-stop 38 is located between lens-elements in a multi-lens assembly. That is, the interpretation of the statement that 'an aperture-stop is located between the imager and the camera-lens' includes examples where the aperture-stop 38 is between lens-elements in a multi-lens assembly. Additionally, the aperture-stop 38 may be placed at any location within the multi-lens assembly based on the design of the multi-lens assembly. Advantageously, the light-shield 32 is positioned at the aperture-stop 38 of the camera-lens 28 to maximize the light-blocking efficiency, as will be recognized by one skilled in the art of optics. The light-shield 32 may be comprised of a transparent-film 35 that supports an absorber 36 sized to block a portion or all of the light-rays 34 of the bright-spot 12 from reaching the imager 16. In the non-limiting example illustrated in FIG. 5, the absorber 36 may be located at the aperture-stop 38 and may be sized to match the resultant circular diameter of the Sun on the visual horizon, based on the position and size of the aperture-stop 38 and the distance to the imager 16. The absorber 36 may be filtered to block a visible-wavelength-camera that is sensitive to wavelengths in the range of 400 nm to 700 nm, or it may be filtered so that it blocks the near-infrared wavelengths from 700 nm to 1000 nm for use in a night-vision-camera, or it may be filtered so that it blocks both the visible and the near-infrared wavelengths from 400 nm to 1000 nm. Other geometries of the absorber 36 are contemplated and will be recognized by one skilled in the art. The opacity of the absorber 36 may be varied across its diameter and may aid the controller 30 in tracking the bright-spot 12. The opacity may be varied as multiple concentric circles, where the center of the absorber 36 may be the darkest, with each subsequent concentric circle being less opaque. Alternatively, the opacity may be a continuous gradient. When the bright-spot 12 is not detected by the imager 16 the controller 30 may position the absorber 36 at the limits of the field-of-view 14 to minimize the amount of image-data that is obscured. The light-shield 32 may include multiple transparent-films 35 supporting the absorber 36 that may be moved independently from one another to be positioned in the line-of-sight 20 of multiple bright-spots 12. Alternatively a liquid crystal display (LCD), or similar dynamic shape adjustment devices, may be used in place of the transparent-film 35 and absorber 36 to reduce the intensity of the light-rays 34 from the bright-spot 12. Non-limiting examples of multiple bright-spots 12 may include headlamps from approaching vehicles, and the Sun and reflected sunlight (e.g. glint). The position of the bright-spot 12 as detected by the imager 16 may be tracked by the controller 30 across the field-of-view 14. The controller 30 may be configured to position the light-shield 32 using ultrasonic linear motors, servo-motors, and other known devices until the intensity of the light-rays 34 from the bright-spot 12 as detected by the imager 16 are minimized. The result is a reduced maximum light level transmitted onto the imager 16 which allows for improved object-detection and improved object-recognition.

Figure 6:
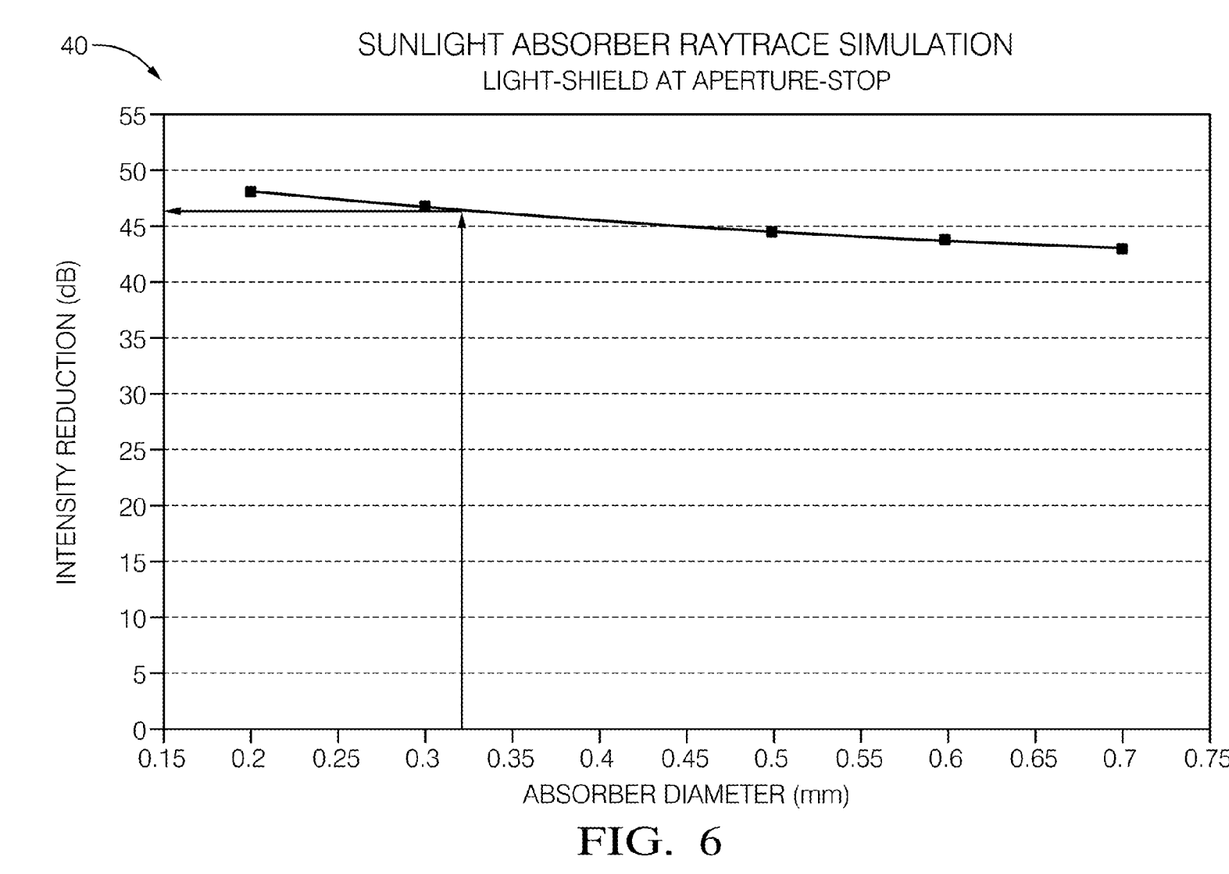
FIG. 6 is a graph of the light intensity reduction in accordance with one embodiment.

FIG. 6 is a graph 40 of a simulation for the camera 10 of FIG. 5 and quantifies the effect of the light intensity reduction based on the diameter of the absorber 36 located at the aperture-stop 38 of the camera-lens 28. The absorber 36 with a 0.32 mm diameter creates a 46 dB intensity reduction of sunlight.

Figure 7:
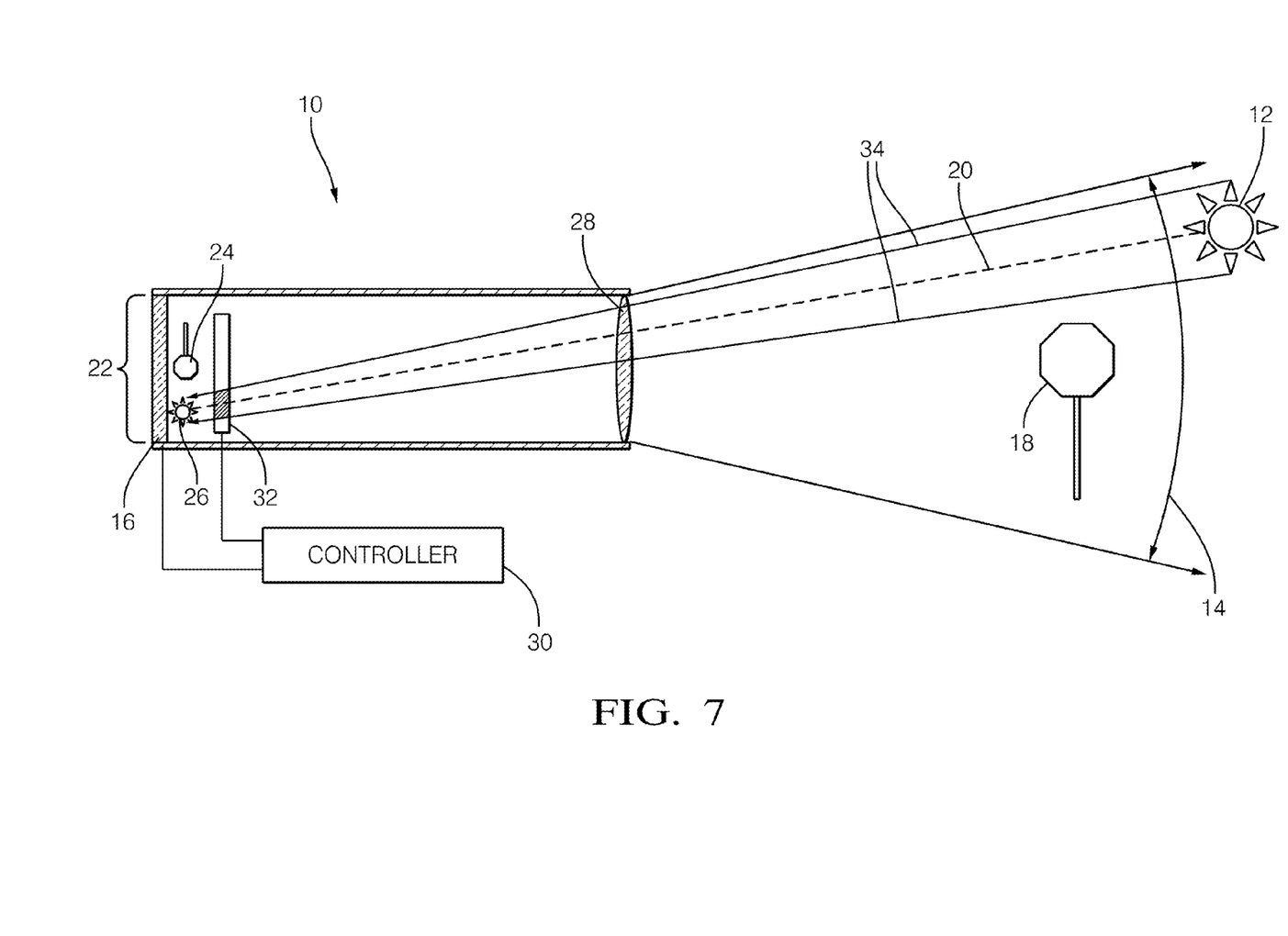
FIG. 7 is a camera system that is modified with a light-shield in accordance with one embodiment.

FIG. 7 illustrates another example of the camera 10 from FIG. 1 that is modified with a light-shield 32 located in close proximity to the imager 16 to reduce the intensity of the light-rays 34 from the bright-spot 12 in the field-of-view 14 of the camera 10. The light-shield 32 may be located between the camera-lens 28 and the imager 16, and may be in electrical communication with the controller 30 such that the light-shield 32 may be moved to a position in the line-of-sight 20 with the bright-spot 12 and the imager 16. The light-shield 32 may be comprised of a transparent-film 35 that supports an absorber 36 sized to block a portion or all of the light-rays 34 of the bright-spot 12 from reaching the imager 16. In the non-limiting example illustrated in FIG. 7, the absorber 36 may be sized to match the resultant circular diameter of the Sun on the visual horizon, based on the distance of the light-shield 32 to the camera-lens 28 and the distance to the imager 16. The absorber 36 may be filtered to block a visible-wavelength-camera that is sensitive to wavelengths in the range of 400 nm to 700 nm, or it may be filtered so that it blocks the near-infrared wavelengths from 700 nm to 1000 nm for use in a night-vision-camera, or it may be filtered so that it blocks both the visible and the near-infrared wavelengths from 400 nm to 1000 nm. Other geometries of the absorber 36 are contemplated and will be recognized by one skilled in the art. The opacity of the absorber 36 may be varied across its diameter and may aid the controller 30 in tracking the bright-spot 12. The opacity may be varied as multiple concentric circles, where the center of the absorber 36 may be the darkest, with each subsequent concentric circle being less opaque. Alternatively, the opacity may be a continuous gradient. When the bright-spot 12 is not detected by the imager 16 the controller 30 may position the absorber 36 at the limits of the field-of-view 14 to minimize the amount of image-data that is obscured. The light-shield 32 may include multiple transparent-films 35 supporting the absorber 36 that may be moved independently from one another to be positioned in the line-of-sight 20 of multiple bright-spots 12. Alternatively a liquid crystal display (LCD), or similar dynamic shape adjustment devices, may be used in place of the transparent-film 35 and absorber 36 to reduce the intensity of the light-rays 34 from the bright-spot 12. Non-limiting examples of multiple bright-spots 12 may include head-lamps from approaching vehicles, and the Sun and reflected sunlight (e.g. glint). The position of the bright-spot 12 as detected by the imager 16 may be tracked by the controller 30 across the field-of-view 14. The controller 30 may be configured to position the light-shield 32 using ultrasonic linear motors, servo-motors, and other known devices until the intensity of the light-rays 34 from the bright-spot 12 as detected by the imager 16 are minimized. The result is a reduced maximum light level transmitted onto the imager 16 which allows for improved object-detection and improved object-recognition.

Figure 8:
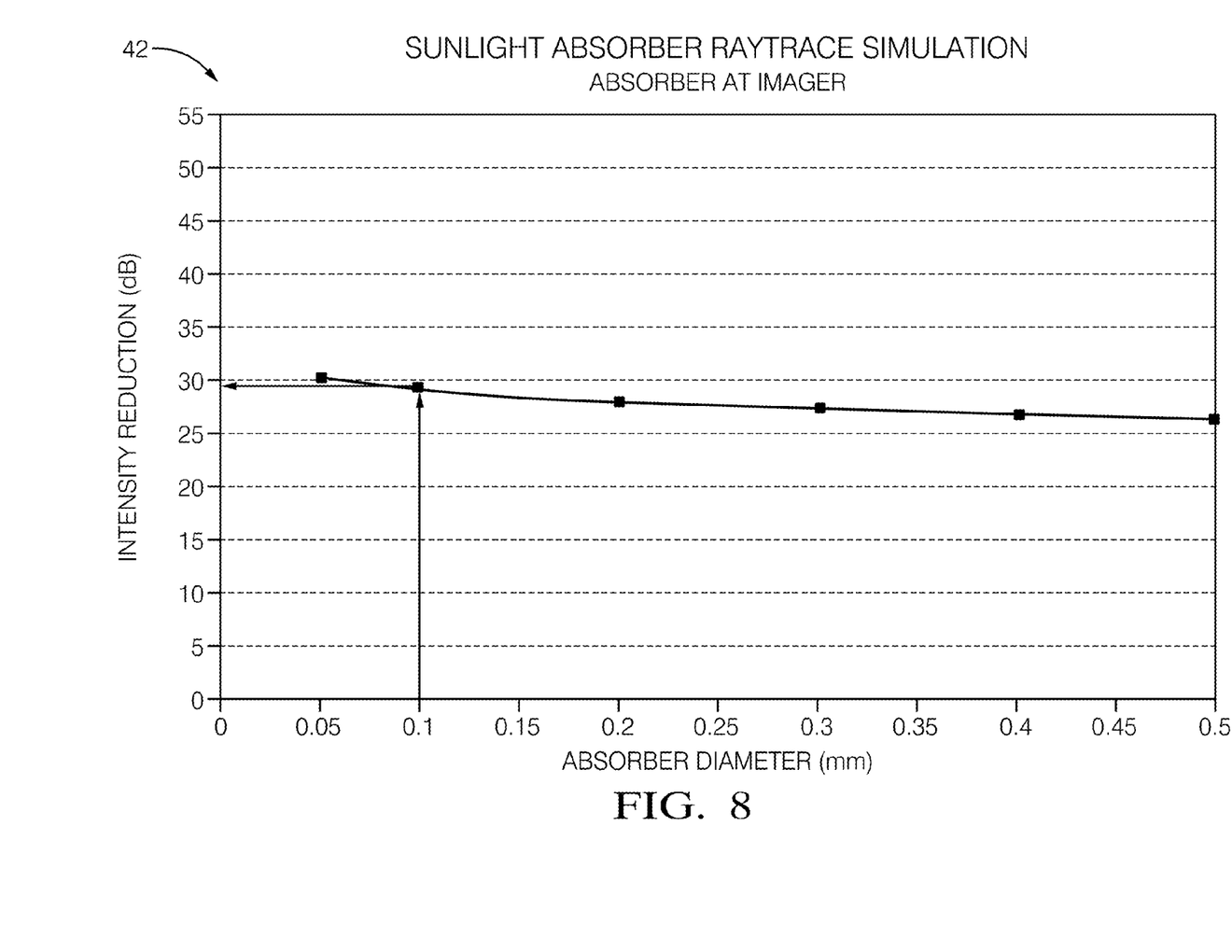
FIG. 8 is a graph of the light intensity reduction in accordance with one embodiment.

FIG. 8 is a graph 42 of a simulation for the camera 10 of FIG. 7 and quantifies the effect of the light intensity reduction based on the diameter of the absorber 36 located a distance of 1 mm from the imager 16. The absorber 36 with a 0.1 mm diameter creates a 30 dB intensity reduction of sunlight.

Contrast improvement for image-elements that are positioned next to the absorber-blocked-image section (e.g. approximately two to five times the absorber-blocked-image area) may be achieved using histogram equalization or other image-processing techniques known in the art. The image-area around the absorber-blocked-image may be post-processed to normalize the contrast for the scene-elements that may be affected by the bright-spot-image 26 the absorber-blocked-area. This may be advantageous due to the "haloing effect" that the bright-spot-image 26 imparts around the actual bright-spot-image-area. The contrast improvement image-processing may be combined with the absorber-opacity-shape to further reduce the dynamic range of brightness in the image 22.

Accordingly, a camera system 10, and a controller 30 for the camera system 10 is provided. The use of a light-shield 32 solves the problem of a saturated imager 16 causing an object-image 24 to appear much darker than the object 18, and allows for improved object-detection and improved object-recognition.

While this invention has been described in terms of the preferred embodiments thereof, it is not intended to be so limited, but rather only to the extent set forth in the claims that follow.

We claim:

1. A camera system, said system comprising:
an imager used to detect an image of a field-of-view of the system;
a light-shield operable to block a portion of the image from being received by the imager, the light-shield including an absorber configured to block light-rays of a bright-spot in the field-of-view; and
a controller in communication with the imager and the light-shield, said controller configured to:
detect a bright-spot based on a position of the bright-spot on the imager;
the position of the bright-spot determined by light intensity signals received from the imager;
track the bright-spot across the field-of-view based on the light intensity signals;
position the absorber in a line-of-sight between the bright-spot and the imager such that the absorber blocks all of the light-rays from the bright-spot in the field-of-view from reaching the imager while allowing light-rays from an image-area around an absorber-blocked-image section of the field-of-view to reach the imager;
wherein the absorber is a liquid crystal filter configured to match a geometry of the bright-spot;
and wherein the absorber is comprised of a plurality of concentric circles, wherein each subsequent concentric circle toward an outer diameter of the absorber is less opaque than the previous concentric circle.

2. The system in accordance with claim 1, wherein the system includes a camera-lens interposed between the imager and the field-of-view, said camera-lens used to focus the image onto the imager.

3. The system in accordance with claim 2, wherein the system includes an aperture-stop located between the imager and the camera-lens, and the light-shield is located at the aperture-stop.

4. The system in accordance with claim 2, wherein the light-shield is located between the camera-lens and the imager.

5. The system in accordance with claim 1, wherein a shape of the absorber is dynamically adjusted.

6. The system in accordance with claim 1, wherein the controller detects and tracks a plurality of bright-spots and positions a plurality of absorbers in the line-of-sight between the plurality of bright-spots and the imager.

7. The system in accordance with claim 1, wherein the absorber blocks light with wavelengths in a range from 400 nm to 700 nm.

8. The system in accordance with claim 1, wherein the absorber blocks light with wavelengths in a range from 700 nm to 1000 nm.

9. The system in accordance with claim 1, wherein the absorber blocks light with wavelengths in a range from 400 nm to 1000 nm.

10. The system in accordance with claim 1, wherein an opacity of the absorber is varied across a dimension of the absorber.

11. The system in accordance with claim 1, wherein the absorber has a diameter in a range from 0.05 mm to 0.5 mm.

12. The system in accordance with claim 1, wherein a center of the absorber is darkest relative to the plurality of concentric circles.

13. A method of operating a camera system, said method comprising:

detecting an image of a field-of-view of the camera system with an imager;

blocking, with a light-shield, a portion of the image from being received by the imager, the light-shield including an absorber configured to block light-rays of a bright-spot in the field-of-view; and detecting, with a controller in communication with the imager and the light-shield, a bright-spot based on a position of the bright-spot on the imager;

the position of the bright-spot determined by light intensity signals received from the imager;

tracking, with the controller, the bright-spot across the field-of-view based on the light intensity signals;

positioning, with the controller, the absorber in a line-of-sight between the bright-spot and the imager such that the absorber blocks all of the light-rays from the bright-spot in the field-of-view from reaching the imager while allowing light-rays from an image-area around an absorber-blocked-image section of the field-of-view to reach the imager;

wherein the absorber is a liquid crystal filter configured to match a geometry of the bright-spot;

and wherein the absorber is comprised of a plurality of concentric circles, wherein each subsequent concentric circle toward an outer diameter of the absorber is less opaque than the previous concentric circle.

14. The method in accordance with claim 13, wherein the controller detects and tracks a plurality of bright-spots and positions a plurality of absorbers in the line-of-sight between the plurality of bright-spots and the imager.

15. The method in accordance with claim 13, wherein the absorber blocks light with wavelengths in a range from 400 nm to 700 nm.

16. The method in accordance with claim 13, wherein the absorber blocks light with wavelengths in a range from 700 nm to 1000 nm.

17. The method in accordance with claim 13, wherein the absorber blocks light with wavelengths in a range from 400 nm to 1000 nm.

18. The method in accordance with claim 13, wherein an opacity of the absorber is varied across a dimension of the absorber.

19. The method in accordance with claim 13, wherein the absorber has a diameter in a range from 0.05 mm to 0.5 mm.

* * * * *